(12) United States Patent
Lee et al.

(10) Patent No.: US 7,941,260 B2
(45) Date of Patent: May 10, 2011

(54) RAPID ENGINE MAPPING AND MODELING

(75) Inventors: Byungho Lee, Ann Arbor, MI (US);
Yann G. Guezennec, Upper Arlington, OH (US)

(73) Assignee: GM Global Technology Operations LLC

( * ) Notice: Subject to any disclaimer, the term of this patent is extended or adjusted under 35 U.S.C. 154(b) by 1000 days.

(21) Appl. No.: 11/744,495

(22) Filed: May 4, 2007

(65) Prior Publication Data

US 2007/0265805 A1    Nov. 15, 2007

Related U.S. Application Data

(60) Provisional application No. 60/799,007, filed on May 9, 2006.

(51) Int. Cl.
*G06F 19/00*    (2006.01)
(52) U.S. Cl. .......................................................... 701/59
(58) Field of Classification Search ............ 701/51–110;
702/187; 73/114.61
See application file for complete search history.

(56) References Cited

U.S. PATENT DOCUMENTS

| | | | | |
|---|---|---|---|---|
| 7,392,129 B2 * | 6/2008 | Hill et al. ...................... | 701/105 |
| 2003/0216847 A1 * | 11/2003 | Bellinger ........................ | 701/51 |
| 2005/0080537 A1 * | 4/2005 | Cawthorne et al. ............. | 701/51 |
| 2005/0080538 A1 * | 4/2005 | Hubbard et al. ................ | 701/54 |
| 2005/0080539 A1 * | 4/2005 | Hubbard et al. ................ | 701/54 |

FOREIGN PATENT DOCUMENTS

WO    WO2006/120728    11/2006

OTHER PUBLICATIONS

Byungho Lee, B.S., M.S.; "Methodology for Rapid Static and Dynamic Model-Based Engine Calibration and Optimization"; The Ohio State University 2005; 238 pages.
Christopher H. Onder and Hans P. Geering; "Model-Based Engine Calibration for Best Fuel Efficiency"; Feb. 27-Mar. 2, 1995; SAE Technical Paper Series 950983; 10 Pages.
Elbert Hendricks and Spencer C. Sorenson; "Mean Value Modelling of Spark Ignition Engines"; Feb. 26-Mar. 2, 1990; SAE Technical Paper Series 900616; 18 Pages.

* cited by examiner

*Primary Examiner* — M. McMahon (57) ABSTRACT

A method of mapping and modeling an engine during an engine development process includes testing the engine over a plurality of actual engine operating conditions and gathering actual engine data corresponding to the actual engine operating conditions. A plurality of parameter functions are determined based on the actual engine data, each of the plurality of parameter functions correspond to an engine operating parameter. A plurality of combustion parameters are generated for a plurality of engine operating conditions that include the plurality of actual engine operating conditions and a plurality of virtual engine operating conditions. An engine simulation model is calibrated based on the plurality of combustion parameters and a plurality of engine maps are generated using the simulation model.

20 Claims, 4 Drawing Sheets

RAPID ENGINE MAPPING AND MODELING

CROSS-REFERENCE TO RELATED APPLICATIONS

This application claims the benefit of U.S. Provisional Application No. 60/799,007, filed on May 9, 2006. The disclosure of the above application is incorporated herein by reference.

FIELD

The present disclosure relates to internal combustion engine development, and more particularly to a rapid engine mapping and modeling method that improves and simplifies the engine development process.

BACKGROUND

The statements in this section merely provide background information related to the present disclosure and may not constitute prior art.

Internal combustion engines generate drive torque by combusting an air and fuel mixture. More specifically, air is drawn into an intake manifold through a throttle. The air is distributed to cylinders and is mixed with fuel. The fuel and air mixture is compressed within a cylinder by a reciprocally driven piston. The compressed air and fuel mixture is combusted and the resultant combustion drive the piston within the cylinder, which rotatably drives a crankshaft.

Advancements of automotive engine technologies have resulted in engines that are equipped with advanced actuators and sensors, which provide increased control over engine operation. As a result, the basic engine operation has changed in order to improve fuel economy and to reduce emissions without sacrificing engine performance. These additional actuator inputs include, but are not limited to, cam phasers, variable valve lift, direct injection, cylinder deactivation, variable intake tuning and the like, and provide sizable improvement in fuel economy and emissions.

These additional degrees of engine control freedom, however, lead to a significant increase in engine mapping and calibration requirements during the engine design and control system development process. For this reason, a comprehensive methodology is needed to provide a systematic approach to assist the engine control system development and calibration processes within a math-based framework.

A traditional engine mapping and control methodology is disclosed in SAE Paper 950983 by Christopher Onder and Hans Geering, which describes an approach of modeling parameters in a combustion characterization function. The combustion characterization function is used to predict how combustion occurs at engine operating conditions where no test data is measured. The method disclosed in SAE Paper 950983, however, is primarily intended for obtaining initial spark timing and fueling quantity calibration maps for the optimal fuel economy in an engine with fixed cam timings. As a result, this method has limited application, and is not usable for engines with more complex control options. Further, predictions of the combustion parameters are performed in a vicinity of reference points, which causes discontinuities in the resulting combustion parameters whenever the model switches to different reference points. Finally, while the above-described method predicts combustion parameters relatively independent of engines used, the approach was limited to Spark-Ignition (SI) engines only, lacking the flexibility to be used for other engine types, such as Compression-ignition Direct-injection (CIDI) engines and Homogeneous-Charge Compression-Ignition (HCCI) engines.

Using such traditional methods, engine tests are conducted by adjusting a single input parameter, while maintaining all of the other parameters constant. Consequently, the number of experiments quickly reaches a level for which it would be practically impossible to carry out all of the experiments in an actual engine setup. This becomes even more apparent when the engine is equipped with today's advanced actuators, e.g. dual cam phasers, variable valve lift, high-pressure direct-injection, etc. As an example, assume that there are five control input parameters (throttle angle, intake/exhaust cam positions, spark timing, and fuel injection) and one engine operating setpoint (engine speed). Assuming the stoichiometric air/fuel ratio operations at all time, there are still four control inputs and one engine operating setpoint that can continuously vary within the operating ranges. Therefore, considering seven levels for each of the input parameters, 16807 test cases ($=7^5$) would be required for the engine experiments.

SUMMARY

The object of the present invention is to provide a comprehensive method that enables rapid design and calibration of a prototype control algorithm at an early stage of the engine development process.

Accordingly, the present invention provides a method of mapping and modeling an engine during an engine development process. The method includes testing the engine over a plurality of actual engine operating conditions and gathering actual engine data corresponding to the actual engine operating conditions. A plurality of parameter functions are determined based on the actual engine data, each of the plurality of parameter functions corresponding to an engine operating parameter. An engine simulation model is provided based on the plurality of actual engine operating conditions and the plurality of virtual engine operating conditions. A plurality of engine maps is generated using the engine simulation model.

In other features, the step of providing an engine simulation model includes generating a plurality of combustion parameters for a plurality of engine operating conditions that include the plurality of actual engine operating conditions and a plurality of virtual engine operating conditions. The engine simulation model is based on the combustion parameters. The engine simulation model based is calibrated based on the plurality of combustion parameters.

In another feature, the method further includes varying engine operating parameters over the engine operating conditions during the step of testing.

In another feature, the parameter functions are determined using a Wiebe function.

In another feature, the parameter functions include at least one of a spark timing, a burn duration, curve shaping factors, and a 50% burn location.

In another feature, the method further includes generating a mean-value engine model (MVEM) based on the plurality of engine maps, and simulating engine dynamic responses during transient conditions using the MVEM.

In still another feature, each of the parameter functions is based on at least one of engine operating conditions and actuator inputs, such as an engine speed, an intake manifold pressure, an exhaust manifold pressure, an air per cylinder, an exhaust vale closure timing, an intake valve open timing, a spark timing, and a throttle position.

In yet other features, the method further includes validating the engine simulation model at virtual engine operating points based on the actual engine data. The step of validating includes pre-processing of inputs to the engine simulation model and post-processing of outputs of the engine simulation model.

The rapid engine mapping and modeling method of the present invention provides virtual engine data suitable for generating calibration maps for engines with advanced actuators including, but not limited to, cam phasers, variable valve lift, direct injection, cylinder deactivation, variable intake tuning, and the like. More specifically, the rapid engine mapping and modeling method generates engine test data in a virtual environment for control system analysis and design applications. The required accuracy is also provided for extracting calibration maps not only for optimal spark timing and fueling quantity but also for optimal actuator set-points for other actuators such as, for example, cam phaser angle, valve lift height, fuel injection timing, port throttle angle, intake tuning valve angle, and the like. Further, the rapid engine mapping and modeling method of the present invention provides Response Surface Models (RSM), which are typically required for constructing a Mean-Value Engine Model (MVEM).

The rapid engine mapping and modeling method of the present invention can quickly be adapted to CIDI and HCCI engine types as well, due to the nature of the RSM-based parameterization functions. Further, variations of the combustion parameters are smooth by nature. More specifically, due to the RSM-based parameterization functions, the rapid engine mapping and modeling method of the present invention provides smooth variations of combustion parameters over the entire engine operating conditions, without the discontinuities, from which the traditional methodology suffers.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
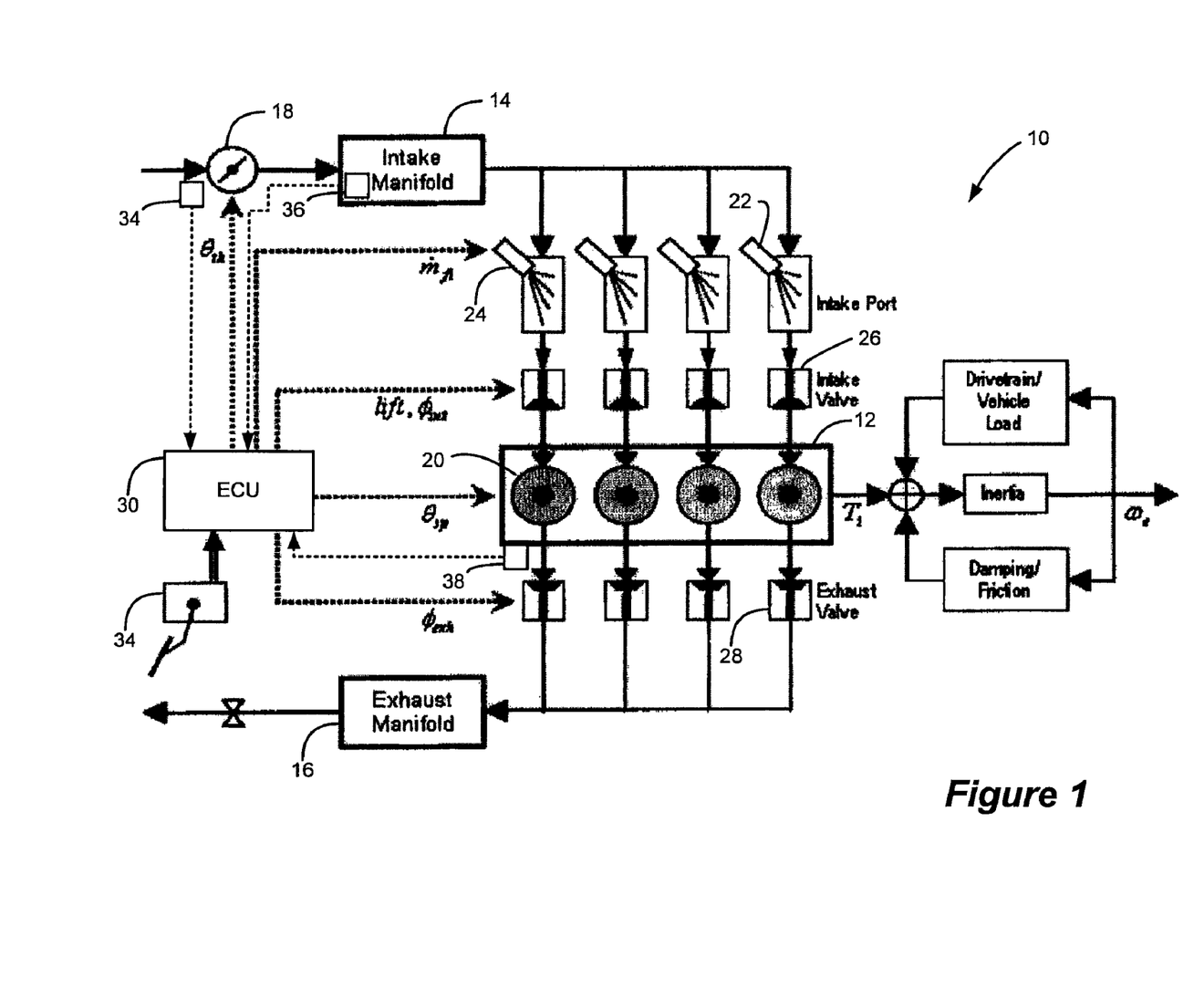
FIG. 1 is a functional block diagram of an exemplary engine system that is mapped and calibrated using the rapid engine mapping and modeling method of the present invention.

Referring now to FIG. 1, an exemplary engine system 10 includes an engine 12 having an intake manifold 14 and an exhaust manifold 16. Air is drawn into the intake manifold 14 through a throttle 18. The air is distributed to cylinders 20. More specifically, a fuel injector 22 injects fuel into the air within an intake port 24 to provide an air and fuel mixture. The air and fuel mixture is drawn into the cylinder 20 through an intake valve 26. The air and fuel mixture is combusted within the cylinder 20 to reciprocally drive a piston to produce drive torque. Exhaust that results from the combustion process is exhausted from the cylinder 20 through an exhaust valve 28 to the exhaust manifold 16. The exhaust is treated in an after-treatment system (not shown) and is released to atmosphere.

A control module 30 regulates operation of the engine system 10 based on an operator input 32 (e.g., an accelerator pedal position) and engine operating parameters. More specifically, a plurality of sensors are provided, which monitor the engine operating parameters. The plurality of sensors include, but are not limited to, a throttle position sensor 34, an intake manifold absolute pressure (MAP) sensor 36 and an engine speed sensor 38. The control module 30 generates control signals to adjust actuators, which regulate operation of the engine system 10.

The exemplary engine system 10 includes variable valve actuation (VVA), whereby the opening, closing and lift of the intake and exhaust vales 26, 28 can be adjusted relative to one another and/or relative to a rotational position of the crankshaft. More specifically, two intake and two exhaust valves are provided per cylinder and there is no external exhaust gas recirculation (EGR) loop integrated in the system. Although, it is anticipated that the method of the present invention can be implemented with an EGR loop. The EGR of the exemplary engine system 10 is regulated by the in-cylinder residual gas internally. The valvetrain utilizes two distinctive intake valve lift profiles (i.e., low and high) with dual-independent cam phasers equipped in both intake and exhaust sides that retard or advance the respective cam positions with respect to crank angle. It is also anticipated that the spark timing and the amount of fuel injected can both be regulated.

Although the engine system 10 described herein is a four-cylinder, spark-ignition, port-fuel injection engine with a variable valve mechanism, it is appreciated that the rapid engine mapping and modeling method can be implemented in engine systems that includes any number and type of actuators and sensors.

Figure 2:
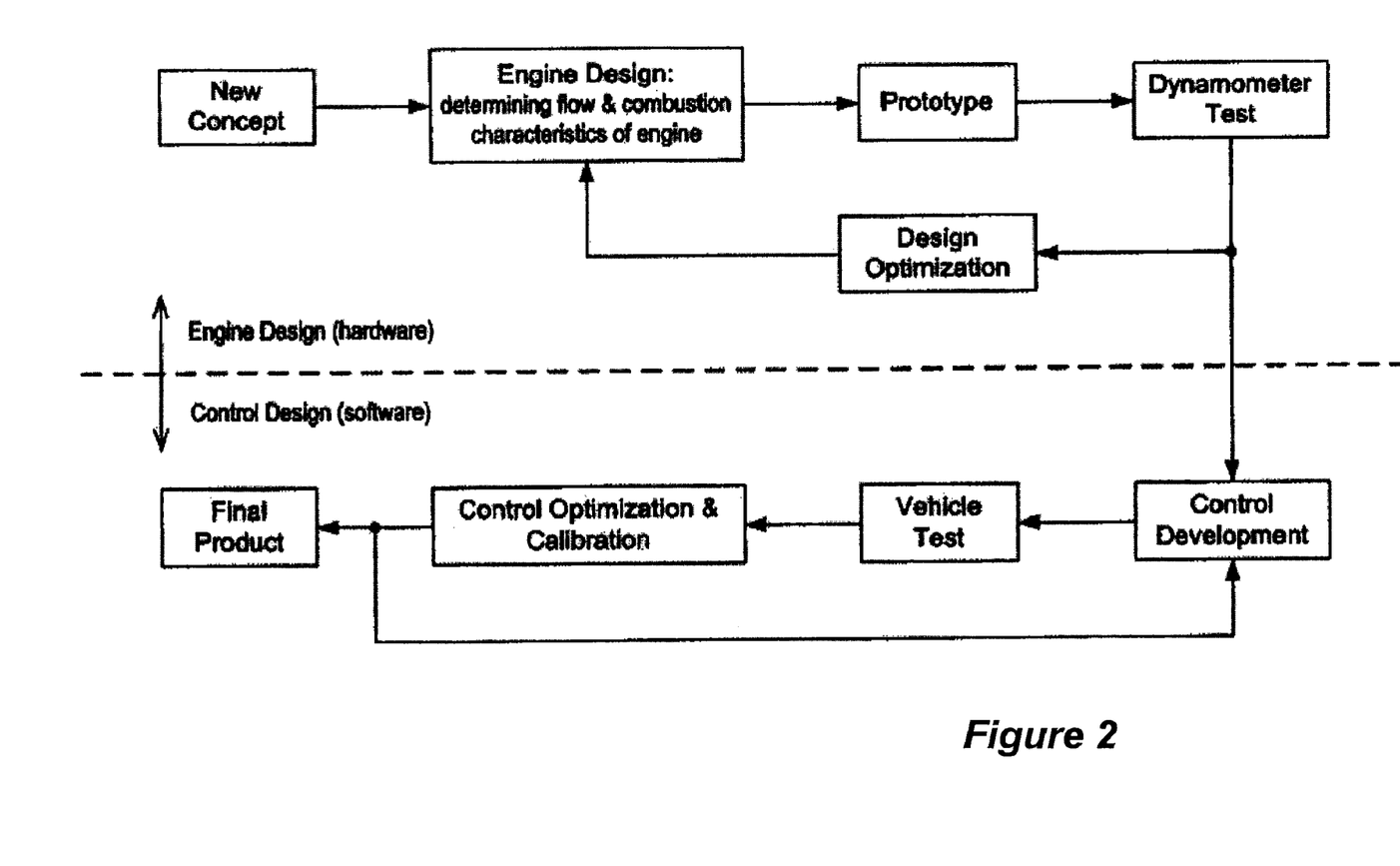
FIG. 2 is a block diagram of an engine and control development process.

Referring now to FIG. 2, a typical engine development process will be described. The development process includes the two main steps of engine design or hardware development and control design. During the hardware development phase, design specifications including, but not limited to, engine size, performance, fuel economy requirements and emissions constraints are outlined and the engine design is carried out. At this stage, most of the gas flow and combustion characteristics are determined in accordance with design specifications.

Afterwards, an optimized engine control algorithm is developed. A control strategy is determined based on the intended design objectives of the engine and dynamometer test results. The initial or prototype control algorithm is tested in an experimental vehicle equipped with sophisticated measurement and data acquisition systems to precisely monitor the performance of the control algorithm. Several iterations may be executed to sufficiently optimize and fine-tune the behavior of the engine and its actuators within the pre-determined physical boundaries.

Figure 3:
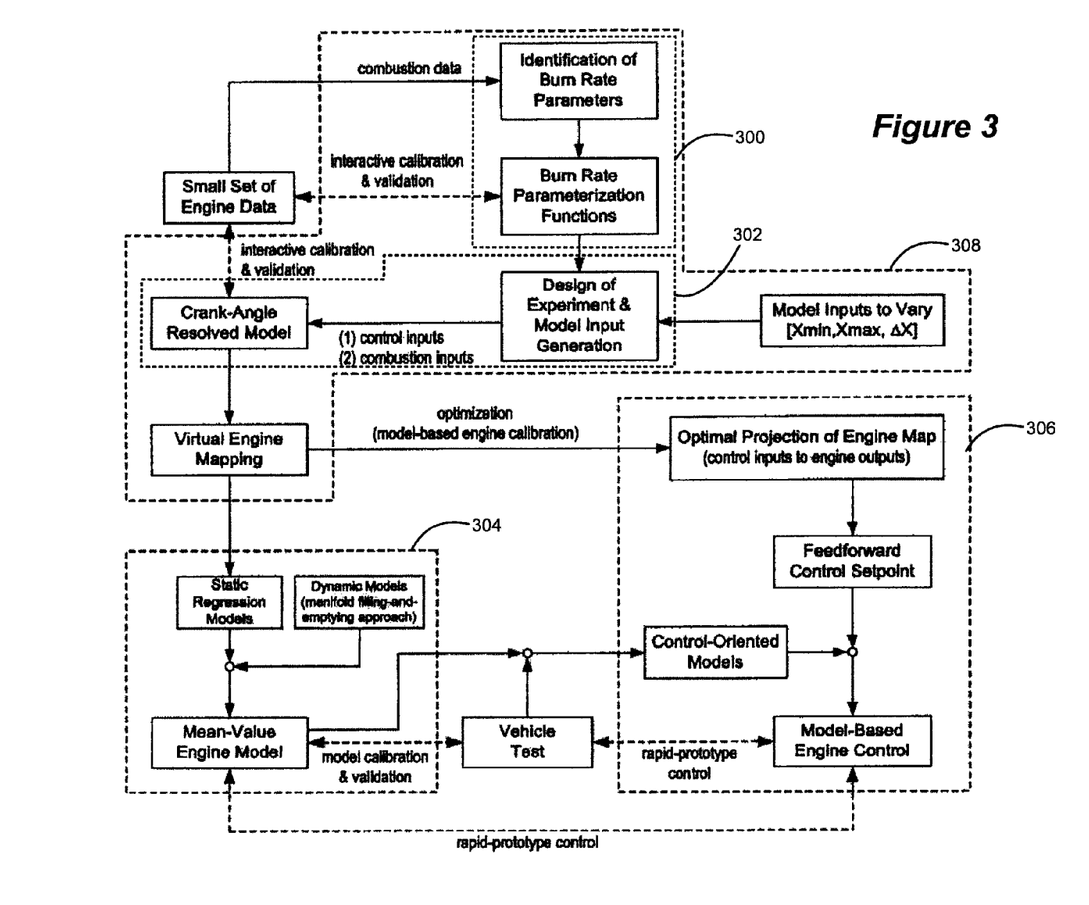
FIG. 3 is a block diagram of the rapid engine mapping and mean-value engine modeling method of the present invention.

The control strategy that is ultimately executed by the control module 30 is developed using the rapid engine mapping and modeling method of the present invention. With reference to FIG. 3, the rapid engine mapping and mean-value engine modeling method of the present invention determines engine maps and optimized actuator set-points while relieving a significant portion of the experimental burdens and accelerating the engine development and calibration processes. More specifically, the rapid engine mapping and mean-value engine modeling method is executed in a math-based/virtual environment to provide a virtually-created engine map that is used to tune/calibrate a Mean-Value Engine Model (MVEM), which is typically used for control system analysis and design.

The method of the present invention consists of four procedures: Burn Rate Parameterization (BRP) 300, Virtual Engine Mapping 302, Mean-Value Engine Modeling 304, and Model-based Engine Optimization, Calibration and Control Development (MEOCCD) 306. The BRP 300 and Virtual Engine Mapping 302 can be lumped together in a Model-based Engine Mapping (MEM) procedure 308.

The BRP 300 takes a limited amount of engine data, which is gathered during a dynamometer and/or vehicle test, and models the parameters that make up a mathematical function describing the mass fraction burned (i.e. burn rate) inside each of the cylinders. These parameters are modeled to vary over engine operating conditions, unlike the conventional methods, which use fixed parameters to model the combustion processes. The Virtual Engine Mapping 302 utilizes the parameterized burn rate functions to generate combustion parameters which will define proper combustion characteristics at operating conditions where no actual data is measured. In other words, the Virtual Engine Mapping 302 uses the small set of actual data to determine the combustion parameters for virtual operating parameters. These combustion parameters are used in a calibrated one-dimensional engine model (e.g., GT-Power) to simulate engine operation over its defined operating region. The simulation generates all of the relevant engine outputs that define its operation and performance to create the Virtual Engine Maps (VEM).

The generated VEMs are used to generate the MVEM, which is a lumped-parameter model that is used to simulate the engine dynamics and responses during transient conditions. The VEM data, in hand with the engine geometrical data used in the one-dimensional engine model, is utilized to tune and validate the MVEM. The MVEM is ultimately used for the math-based control system analysis and design with minimal use of actual engine hardware.

In general, it is desired to model the overall behavior of the engine over several engine cycles to investigate the engine's response to various transient inputs including, but not limited to, throttle transients or load transients. Accordingly, it is important to model all of the dynamic phenomena that are relevant in the dynamic time-scale of interest. Because of the computational constraints, it is too complex to model each detail of the physical processes. Instead, traditional methods implement empirical models (such as Response Surface Models) that represent the processes that are either not understood, or are too complicated to model. Such empirical models are generated based on collected engine data. With the rapid engine mapping and mean-value engine modeling method of the present invention, however, the generated virtual engine maps can be used to develop the empirical models, thereby reducing the dependency on expensive and time consuming engine tests.

The MEOCCD 306 provides optimized engine maps by projecting control inputs onto engine output variables based on selected optimization criteria. The optimized virtual engine maps are used as feed-forward control set-points and the MVEM is used as a virtual engine test plant, with which engineers can quickly test and validate control algorithms. As a result, the rapid engine mapping and mean-value engine modeling method of the present invention provides fast and reliable evaluation of a prototype control algorithm in a virtual environment.

Figure 4:
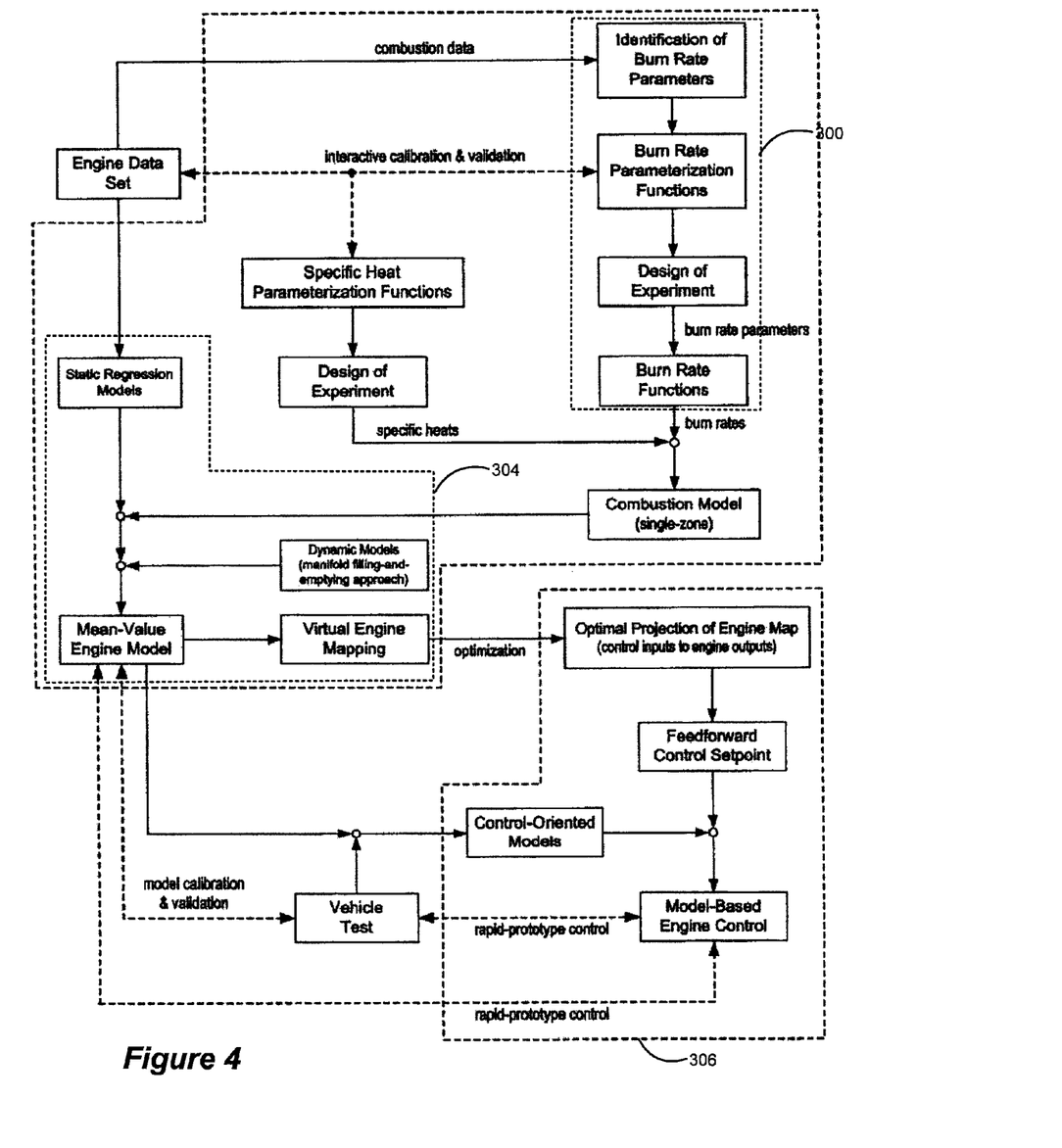
FIG. 4 is a block diagram of an alternative rapid engine mapping and mean-value engine modeling method in accordance with the present invention.

Referring now to FIG. 4, the rapid engine mapping and mean-value engine modeling method of the present invention can be implemented with an alternative development strategy. The alternative development strategy uses an engine control strategy that is pre-determined prior to engine testing. In general, the pre-determined control strategy forces the engine to operate along a pre-determined trajectory. The engine experiments are performed only along this trajectory and provide data corresponding to that trajectory alone. In other words, the engine experiments are not carried out for all available operating conditions. If a different control strategy is adopted, the new strategy changes the engine operating conditions along a different trajectory.

After the pre-determined control strategy is generated, engine tests are performed around operating conditions that would be realized by the particular control strategy. Even if the engine test is at an initial stage and offers only a limited amount of sparse engine data, a functional (i.e., continuous) parameterization of burn rate parameters can still be achieved using the BRP of the present invention. One of the differences to the method of FIG. 3 is that another functional parameterization is performed for specific heat ratios of gas mixture inside an engine cylinder. After estimating the burn rate parameters and specific heat ratios, the engine torque can be predicted based on a single-zone combustion approach for combinations of engine input parameters that are not extensively tested. The MVEM is constructed by combining the engine torque model with the rest of the static models (i.e., empirical models), and the dynamic sub-models described above. The main difference of this alternative approach is that a crank-angle resolved engine model is not utilized and that the MVEM is the primary tool for generating the virtual engine maps.

Burn Rate Parameterization

The BRP provides a way of correctly identifying combustion parameters at selected engine operating conditions and constructing functions to estimate the parameters which would lead to accurate predictions of engine output variables. The BRP starts with a sparse engine data set and ends up with a functional parameterization of burn rate parameters. The functional parameterization enables reliable predictions of the mass fraction burned inside an engine cylinder for virtual operating conditions (i.e., those that are not explored experimentally). Initially, the experimental engine data that is used to calibrate the crank-angle resolved engine model and to create the burn rate parameterization functions is described based on the exemplary engine system 10, described in detail above. Such an exemplary engine system offers a higher degree of control freedom than conventional engines.

The engine data is first divided into several ranges of engine speed and is then displayed with respect to engine load (air quantity inducted per cylinder) and cam phasing positions for both intake and exhaust valves. The engine data is very sparse in the multi-dimensional space afforded by the exemplary variable valve actuator (VVA) engine system 10. Prescribed heat release profiles describe the in-cylinder combustion process during engine simulations at various steady-state conditions. The prescribed heat release profiles are determined by using the Wiebe function, which is provided as:

$$x_b = 1 - \exp\left[-a\left(\frac{\theta - \theta_0}{\Delta\theta}\right)^{m+1}\right]$$

where:
$x_b$ is the mass fraction burned;
$\theta$ is the crank angle from IVC to EVO;
$\theta_0$ is the crank angle at the start of combustion;
$\Delta\theta$ is the burn duration in crank angle (typically 10-90%); and
a, m are curve shaping parameters fitted to combustion data.

The Wiebe function is used to model the combustion processes because it has certain advantages over other methods that are more physically based to model the combustion processes. First, it is mathematically simple, which is an extremely important factor to reduce the computational burdens when a large number of simulations are required for engine mapping purposes. Second, it is quite accurate once proper parameters in the empirical function are provided. The virtual engine mapping of the present invention maximizes these benefits.

Before the burn rate parameterization is performed, the burn rate parameters are first identified at each of the reference engine operating condition, at which engine experiments are carried out. Based on the combustion data, an optimal combination of the burn rate parameters is identified at each engine operating condition. Because the burn durations ($\Delta\theta$) are easy to obtain and are usually provided in typical combustion data as the crank-angle durations measured from 10% to 90% burn locations, only the curve shaping factors a and m need to be identified based on the combustion data. The curve shaping factors are identified and the burn rate is obtained using the Wiebe function. The Wiebe function can reconstruct an accurate burn rate profile when compared to experimentally measured burn rates.

After identifying the curve shaping factors, functional relationships are developed between the burn rate parameters (i.e., burn duration $\Delta\theta$, curve shaping factors a and m) and engine input parameters as well as operating conditions. The basic form of the functions for the exemplary engine system 10 is provided as:

$$[\Delta\theta, a, m] = f(\theta_{sp}, \text{lift}, \phi_{in}, \phi_{ex}, N, MAP, AFR, m_{a,cyl}, m_{r,cyl})$$

where:
$\theta_{sp}$ is the spark advance;
lift is the intake valve lift (i.e., low or high);
$\phi_{in}$ is the intake cam phase angle;
$\phi_{ex}$ is the exhaust cam phase angle;
N is the engine RPM;
AFR is the air to fuel ratio;
$m_{a,cyl}$ is the mass of air trapped in the cylinder; and
$m_{r,cyl}$ is the mass of residual gas trapped in the cylinder.

Because the exemplary engine system 10 is intended to operate around the stoichiometric AFR at all times, except during power enrichment operations, the AFR usually remains at a constant value of 14.6, for example. For this reason, the AFR cannot be regarded as one of the independent variables. On the other hand, the intake MAP, mass of fresh air and residual gas inside the cylinders are considered to be outputs of engine operations. Because, the burn rate parameterization predicts the combustion processes prior to running engine simulations, the engine outputs can not be used as independent variables for the burn rate parameterization functions. Consequently, a new independent variable is provided, which effectively replaces the engine outputs as independent variables.

In conventional engines, the throttle position is regarded as a primary control variable that determines the engine load. Because both intake MAP and air per cylinder are usually considered as engine load variables, the throttle position can be used to replace these variables. However, there are additional input variables that regulate engine load, such as intake valve lift and cam phaser positions for the exemplary engine system 10. In spite of that, the throttle position is still a good replacement for those engine load variables, because both intake MAP and air per cylinder depict linear relationships with the throttle position.

Additionally, the residual gas is closely correlated with the cam phaser positions and the valve overlap durations. Moreover, the residual gas is strongly influenced by engine speed and load conditions as well. As a result, the residual gas mass can be replaced by other independent variables such as engine speed, throttle position, and cam phaser positions. In fact, the residual gas mass should itself not be used as an independent variable in order to avoid a collinearity problem. The collinearity occurs when one or more independent variables are correlated with other independent variables, which results in some degree of redundancy or overlaps among them.

Finally, the spark timing as an independent variable for parameterizing the burn rate parameters also needs consideration. Because the spark timing is preferably kept at the maximum brake torque (MBT) timing, it is no longer considered as one of the independent variables. Instead, the MBT spark timing must be considered as a dependent variable, which is parameterized with the other burn rate parameters.

The crank-angle resolved engine model used for the virtual engine mapping process requires a set of combustion parameters different from those used by the standard Wiebe function described above, such as the burn duration $\Delta\theta$, and the curve shaping factors a and m. Instead, the engine model requires burn duration $\Delta\theta$, curve shaping factor m, and 50% burn location ($\theta_{50}$) to generate heat release profiles for in-cylinder combustion modeling. For this reason, the curve shaping parameter a is replaced by the 50% burn location ($\theta_{50}$) as one of the burn rate parameters to be parameterized and to generate combustion inputs to the engine model. Although the MBT spark timing is not a part of the combustion inputs that are exclusively required by the engine model, it is intended to be parameterized for a potential control use of the MBT spark timing function. Accordingly, the parameterization function is described as:

$$[\theta_{sp,MBT}, \Delta\theta, m\theta_{50}] = f(N, \theta_{th}, \text{lift}, \phi_{in}, \phi_{ex})$$

where:
$\theta_{sp,MBT}$ is the MBT spark timing; and
$\theta_{th}$ is the throttle position.

Based on the empirical relations between the dependent and independent variables, the burn rate parameterization functions are built for each of the burn rate parameters and for the MBT spark timing. To achieve this, Stepwise Multiple Regression (SMR) is used. This technique is particularly effective because there are multiple functions for multiple cases that need to be fitted with the experimental engine data.

With the given set of independent variables and their combinations, the SMR adds or subtracts one term at a time in the model. At each step, the algorithm assesses the statistical correlation of the model with the experimental data values and determines whether the term should be included in the model. This ensures that the smallest possible terms are included in the model at the end and that all terms are statistically significant. In this manner, the final regression model presents the highest possible correlation with the experimental data while containing a minimum number of predictor terms. Therefore, the modeling process is fast and automated in nature, which is well suited for fitting multiple regression functions in relative short time with minimal modeling efforts.

Using this approach, the burn rate parameterization functions for each of the burn rate parameters and the MBT spark timing are provided as follows for both cases of the intake valve lift:

MBT Spark Timing
Low Lift:

$$\theta_{sp,MBT} = c_0 + c_1 N + c_2 \theta_{th} + c_3 IVO + c_4 EVC + c_5 EVC^2 + c_6 N \cdot \theta_{th} + c_7 N^2 \cdot \theta_{th} + c_8 N^2 \cdot IVO + c_9 \theta_{th} \cdot EVC^2 + c_{10} IVO^2 \cdot EVC + c_{11} \theta_{th}^2 \cdot IVO^2 + c_{12} \theta_{th}^3 + c_{13} EVC^3$$

High Lift:

$$\theta_{sp,MBT} = c_0 + c_1 \theta_{th} + c_2 IVO + c_3 EVC + c_4 N \cdot \theta_{th} + c_5 N^2 \cdot \theta_{th} + c_6 \theta_{th} \cdot EVC + c_7 \theta_{th} \cdot IVO^2 + c_8 \theta_{th} \cdot EVC^2 + c_9 IVO^2 \cdot EVC + c_{10} \theta_{th}^2 \cdot EVC^2 + c_{11} \theta_{th}^3 + c_{12} EVC^3$$

10-90% Burn Duration
Low Lift:

$$\Delta\theta = c_0 + c_1 N + c_2 \theta_{th} + c_3 IVO + c_4 EVC + c_5 N^2 + c_6 EVC^2 + c_7 \theta_{th}^3$$

High Lift:

$$\Delta\theta = c_0 + c_1 N + c_2 \theta_{th} + c_3 EVC + c_4 EVC^2 + c_5 IVO^2 \cdot EVC + c_6 IVO \cdot EVC^2 + c_7 N^2 \cdot EVC^2 + c_8 \theta_{th}^2 \cdot EVC^2 + c_9 N^3 + c_{10} EVC^3$$

Curve Shaping Factor "m"
Low Lift:

$$m = c_0 + c_1 \theta_{th} + c_2 IVO + c_3 EVC + c_4 EVC^2 + c_5 N \cdot \theta_{th} + c_6 \theta_{th} \cdot IVO + c_7 \theta_{th} \cdot EVC + c_8 \theta_{th} \cdot IVO^2 + c_9 IVO \cdot EVC + c_{10} IVO^2 \cdot EVC + c_{11} IVO \cdot EVC^2 + c_{12} N^2 \cdot \theta_{th}^2$$

High Lift:

$$m = c_0 + c_1 N + c_2 \theta_{th} + c_3 IVO + c_4 EVC + c_5 \theta_{th}^2 + c_6 N \cdot EVC + c_7 N \cdot EVC^2 + c_8 \theta_{th} \cdot EVC + c_9 IVO^2 \cdot EVC + c_{10} \theta_{th}^3 + c_{11} EVC^3$$

50% Burn Location
Low Lift:

$$\theta_{50} = c_0 + c_1 N + c_2 \theta_{th} + c_3 IVO + c_4 N^2 + c_5 \theta_{th}^2 + c_6 N \cdot EVC + c_7 N^2 \cdot IVO + c_8 N \cdot IVO^2 + c_9 \theta_{th} \cdot EVC + c_{10} \theta_{th} \cdot IVO^2 + c_{11} IVO \cdot EVC + c_{12} N^2 \cdot \theta_{th}^2 + c_{13} \theta_{th}^2 \cdot EVC^2 + c_{14} N^3$$

High Lift:

$$\theta_{50} = c_0 + c_1 N + c_2 \theta_{th} + c_3 IVO + c_4 EVC + c_5 \theta_{th}^2 + c_6 IVO^2 + c_7 N \cdot \theta_{th} + c_8 N \cdot EVC + c_9 N^2 \cdot \theta_{th} + c_{10} N \cdot EVC^2 + c_{11} \theta_{th}^2 \cdot EVC^2 + c_{12} \theta_{th}^3 + c_{13} EVC^3$$

From the above relationships, it can be noticed that the IVO and the EVC angles replace the intake and exhaust cam phaser positions to provide more physically based correlations between the burn rate parameters and the cam phasing positions. This is perfectly suitable because the variable valve mechanism for the exemplary engine system 10 is based on the cam-driven actuator, which means that there are unique valve opening and closing timings for given cam phasing positions.

Based on experimentally obtained results of the parameterization functions for MBT spark timing, 10-90% burn duration, curve shaping factor m, and 50% burn location, it is practically feasible to estimate and to predict each of the burn rate parameters quite accurately by using simple polynomial functions with only five independent variables (four continuous inputs and one binary input).

Virtual Engine Mapping

The remainder of the model-based engine mapping portion of the method of the present invention (i.e., the virtual engine mapping) is now described in detail. The virtual engine mapping generates artificially-created engine maps that are representative of actual engine operating conditions, and are thus usable for engine calibration and control development purposes. Initially, the crank-angle resolved engine model is validated at operating points where the experimental data is available for comparisons. The Design Of Experiment (DOE) is carried out to explore a wide range of engine operating conditions in a virtual reality. Finally, engine simulations are performed based on the DOE, and the engine mapping results are provided at selected operating conditions.

Instead of developing a crank-angle resolved engine model as a virtual engine mapping tool, a commercially available simulator (e.g., GT-Power) is used for the virtual engine mapping task. The engine simulator is based on one-dimensional gas dynamics, combined with in-cylinder combustion models of various types. The simulator is capable of accurately predicting the physical phenomena related to the flow motions in pipes, ducts, and flow restrictions in an engine once proper geometrical inputs are provided.

Because the BRP process accurately identifies the parameters of the Wiebe function at a small set of statistically-designed engine operating conditions, and because properly modeling the parameters as simple functions of engine operating conditions and control inputs, it is possible to produce meaningful simulation results for a large number of combinations of engine input parameters that are not tested and measured (i.e., virtual operating points). The biggest advantage of this approach is that the process works even with a small set of actual engine data.

There are four major categories of the model inputs to run the engine model: environmental conditions, engine parameters, control inputs, and combustion related parameters. Constant values of the ambient pressure and temperature define the environmental conditions. The engine parameters consist of geometries of pipes, cylinders, and other various subcomponents in an engine. Also, discharge coefficients of flow restrictions such as throttle plate and intake/exhaust valves are considered as well. The control inputs are physical reference set-points, at which engine actuators are set to operate during the simulations. In addition to the actuator set-points, the engine speed is also considered as a control input since the speed is purposely regulated at intended values during most of the engine dynamometer experiments. Finally, the combustion related parameters required by the engine model are obtained via outputs of the parameterization functions at specified engine operating conditions.

Using the set of control input parameters based on the given engine hardware, the DOE is performed to carry out the engine experiments in the virtual environment. For each of the control input parameters, the operating range was first identified within the physical limits. A traditional method of acquiring a large amount of data, namely the Full Factorial Method, is used. In this method, one of the control inputs was varied by a predetermined increment while holding all other parameters at constant values.

The experiment was continued until all combinations of the input parameters were tested and examined. Based on the Full Factorial Method, there can be 3696 test cases, for example, for the low intake lift and 7392 test cases, for example, for the high intake lift, which provides an exemplary total of 11088 cases to run. Assuming it takes approximately a minute to complete one test case, a total of 184.8 hours (about 7.7 days) of simulation is needed to complete the virtual engine mapping process for the exemplary engine system. Regardless of the intake valve lift mode, there can be still, for example, 616 cases for each engine speed.

When evaluating simulation results, one set of the simulation results is based on the actual combustion parameters such as measured burn duration, measured 50% burn location, and identified curve shaping factor m. Another set of simulation results is based on the estimated combustion input parameters of burn duration, 50% burn location, and curve shaping factor m. All other input parameters to the engine model are the same for both cases of the simulation. The engine model can produce output results that very closely represent the actual engine operations once proper model inputs are provided. In particular, simulation results, such as the mean effective pressures and the quantity of air flow into engine cylinders, which are two key engine output variables (i.e., one representing the combustion process and the other describing the gas exchange process) can be predicted with high accuracy. The engine model also can predict the residual gas fraction trapped inside engine cylinders at each operating condition.

Not all of the test cases that are creatable by the Full Factorial Method are feasible in reality. Without proper filtering of the inputs, undesirable outcomes, which may not be realizable physically, could result during engine simulations. For this reason, a pre-processing of the model inputs and a post-processing of the model outputs is performed. For the pre-processing of the engine model inputs, the estimated burn rate input parameters (i.e., burn duration, curve shaping factor m, and 50% burn location) and MBT spark timing are first used as criteria for determining the feasibility of each simulation case.

Based on the predictions of the combustion parameters for all cases, the feasibility of each test case is examined, and those cases with any of the combustion parameters being evidently unrealizable and physically impossible are excluded from further analyses and simulations. For example, test cases with the MBT spark timing occurring before IVC or 90° before top dead center (BTDC) are excluded from the virtual experiments. Similarly, those test cases with the burn duration, curve shaping parameter m, and 50% burn location that are either negative or excessively large, when compared to the physical test results, are also eliminated from further processing of the virtual engine mapping.

After pre-processing the test cases, the virtual engine mapping is executed for all remaining cases. After completing the engine mapping simulations at various steady-state points, the post-processing on the simulation outputs is executed. For the post-processing of the model outputs, proper filtering on output variables from the engine simulations is performed such that the simulation outcomes including, for example, IMEP and Indicated Specific Fuel Consumption (ISFC) remain within the physically acceptable range. For example, the gross IMEP can never become negative as long as fuel is provided in accordance with the corresponding heat release profile to the engine model. However, when the pumping work is too much for the gross IMEP to overcome, the engine model essentially simulates an engine motoring process, resulting in a negative net IMEP value.

The generated engine maps are provided for a plurality of engine operating parameters. The engine maps can include, but are not limited to, multi-dimensional maps for gross indicated mean effective pressure (IMEP), net IMEP, pumping mean effective pressure (PMEP), air per cylinder, fuel per cylinder, residual gas fraction, volumetric efficiency, engine-out exhaust gas temperature, peak cylinder pressure, crank angle position at peak cylinder pressure and rise in peak cylinder pressure. Each of these operating parameters is mapped with respect to engine operating conditions and actuator positions. For the exemplar engine system 10, each of the engine operating parameters can be mapped with respect to engine speed, intake manifold pressure, intake cam phaser position, and exhaust cam phaser position.

Mean-Value Engine Modeling

An MVEM is constructed based on the virtual engine maps generated by the engine simulations described above. The MVEM simulate the engine dynamics and responses to time-varying inputs during transient conditions. The MVEM assists engineers to analyze and design control algorithms and refine their parameters without frequent visits to engine dynamometers and/or prototype vehicles, while providing a fast and flexible engine calibration and control system design in a virtual environment. The concept of a virtual design tool becomes even more attractive when the complexity of the control system increases as in the case of today's IC engines, while the product development cycle must be shortened due to fierce competitions.

The MVEM consists of two different modeling components: dynamic components based on differential equations and static components based on Response Surface Models (RSM). The dynamic components are based on physics, and usually engine geometrical parameters are the only requirements to build and run the models. A typical example of the dynamics components would be intake/exhaust manifold and crankshaft dynamics models. On the other hand, the static components rely heavily on empirical data to build properly. This is where the virtual engine mapping of the present invention contributes the most with respect to the development and calibration of the MVEM.

A typical example of RSM would be volumetric efficiency and torque production models. Instead of using a large quantity of engine test data to build the RSM properly, the virtually-created engine map of the present invention is utilized, which significantly reduces the cost and time involved to develop and calibrate the MVEM. Accordingly, the rapid engine mapping and modeling method of the present invention reduces the engine hardware development and test requirements, particularly for the engine calibration and control system analysis/design. It also helps realize a parallel development of the control system with engine hardware by allowing the control system development and calibration process to begin at an earlier stage of the engine design.

The virtual engine maps, which are acquired as described above, are implemented in the mean-value engine modeling. Several important engine output variables are artificially manufactured by the virtual engine mapping described above. The regression models for the key output variables are developed based on the virtual engine maps, which play a critical role as subcomponent models within the overall structure of the MVEM. These sub-component models are typically constructed in the form of quasi-static regression functions, which provide non-linear algebraic equations to the MVEM.

These algebraic equations are typically built upon steady-state experimental engine data using the input-output least-square fit method.

In the method of the present invention, however, the experimental data is replaced by the artificially-created engine maps, and the Stepwise Multiple Regression technique is implemented to generate the necessary static regression models. These non-linear algebraic functions are mainly used for modeling engine torque production, volumetric efficiency, engine-out exhaust temperature, and effective flow area of exhaust system, and are provided as follows:

Indicated Mean Effective Pressure (IMEP)
Low Lift:

$$IMEP = c_0 + c_1 N + c_2 p_m + c_3 EVC + c_4 p_m^2 + c_5 EVC^2 + c_6 N \cdot p_m + c_7 N^2 \cdot EVC + c_8 p_m^2 \cdot IVO^2 + c_9 p_m^2 \cdot EVC^2$$

High Lift:

$$IMEP = c_0 + c_1 p_m + c_2 IVO + c_3 p_m^2 + c_4 N \cdot p_m + c_5 N^2 \cdot p_m + c_6 N \cdot IVO + c_7 p_m \cdot IVO + c_8 N^2 \cdot p_m^2 + c_9 N^2 \cdot EVC^2 + c_{10} p_m^3$$

Volumetric Efficiency
Low Lift:

$$\eta_v = c_0 + c_1 N + c_2 p_m + c_3 IVO + c_4 EVC + c_5 EVC^2 + c_6 N \cdot p_m + c_7 N \cdot p_m^2 + c_8 IVO \cdot EVC + c_9 IVO^2 \cdot EVC + c_{10} N^2 \cdot p_m^2 + c_{11} N^2 \cdot EVC^2 + c_{12} IVO^2 \cdot EVC^2$$

High Lift:

$$\eta_v = c_0 + c_1 p_m + c_2 IVO + c_3 EVC + c_4 p_m^2 + c_5 N \cdot p_m + c_6 N \cdot p_m^2 + c_7 p_m \cdot IVO^2 + c_8 IVO \cdot EVC + c_9 p_m^3$$

Engine-Out Exhaust Gas Temperature
Low Lift:

$$T_{eng,out} = c_0 + c_1 N + c_2 p_m + c_3 IVO + c_4 EVC + c_5 IVO^2 + c_6 EVC^2 + c_7 N \cdot p_m + c_8 N \cdot EVC + c_9 N \cdot p_m^2 + c_{10} N \cdot EVC^2 + c_{11} p_m^2 \cdot EVC^2 + c_{12} p_m^3 + c_{13} EVC^3$$

High Lift:

$$T_{eng,out} = c_0 + c_1 N + c_2 p_m + c_3 IVO + c_4 EVC + c_5 EVC^2 + c_6 N \cdot EVC + c_7 N \cdot p_m^2 + c_8 N \cdot EVC^2 + c_9 p_m \cdot EVC^2 + c_{10} IVO^2 \cdot EVC + c_{11} p_m^3 + c_{12} EVC^3$$

Effective Flow Area
Low Lift:

$$A_{eff,exh} = c_0 + c_1 N + c_2 EVC + c_3 N^2 + c_4 N \cdot p_m + c_5 N \cdot EVC + c_6 N^2 \cdot IVO + c_7 N^2 \cdot EVC + c_8 N \cdot IVO^2 + c_9 p_m \cdot EVC^2 + c_{10} N^2 \cdot p_m^2 + c_{11} N^2 \cdot IVO^2 + c_{12} p_m^2 \cdot EVC^2 + c_{13} N^3$$

High Lift:

$$A_{eff,exh} = c_0 + c_1 N + c_2 p_m + c_3 IVO + c_4 EVC + c_5 N \cdot IVO + c_6 N \cdot IVO^2 + c_7 p_m \cdot IVO + c_8 p_m \cdot IVO^2 + c_9 IVO^2 \cdot EVC + c_{10} IVO \cdot EVC^2 + c_{11} IVO^2 \cdot EVC^2 + c_{12} N^3$$

The rapid engine mapping and modeling method provides a tightly coupled approach of rapidly mapping an engine without a significant burden of hardware test, and provides a tool to carry out the control system analysis and design in the math-based/virtual environment. This offers significant advantages by reducing hardware test requirements for engine mapping, by reducing engine development time and improving quality, by minimizing hardware builds to develop new engine technology, and by providing virtual tool for developing control system early in engine design stage.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of mapping and modeling an engine during an engine development process, comprising:
    testing said engine over a plurality of actual engine operating conditions;
    gathering actual engine data corresponding to said actual engine operating conditions;
    determining a plurality of parameter functions based on said actual engine data, each of said plurality of parameter functions corresponding to an engine operating parameter;
    providing an engine simulation model based on said plurality of actual engine operating conditions and said plurality of engine operating parameters; and
    generating a plurality of engine maps using said engine simulation model.

2. The method of claim 1, wherein said step of providing an engine simulation model includes:
    generating a plurality of combustion parameters for a plurality of engine operating conditions that include said plurality of actual engine operating conditions and a plurality of virtual engine operating conditions, wherein said engine simulation model is based on said combustion parameters.

3. The method of claim 2, further comprising calibrating said engine simulation model based on said plurality of combustion parameters.

4. The method of claim 1 further comprising varying engine operating parameters over said engine operating conditions during said step of testing.

5. The method of claim 1 wherein said parameter functions are determined using a Wiebe function.

6. The method of claim 1 wherein said parameter functions include at least one of a spark timing, a burn duration, curve shaping factors, and a 50% burn location.

7. The method of claim 1 further comprising:
    generating a mean-value engine model (MVEM) based on said plurality of engine maps; and
    simulating an engine dynamic response during transient conditions using said MVEM.

8. The method of claim 1 wherein each of said parameter functions is based on at least one of engine operating conditions and actuator inputs.

9. The method of claim 8 wherein each of said parameter functions is based on at least one of an engine speed, an intake manifold pressure, an exhaust manifold pressure, an air per cylinder, an exhaust valve closure timing, an intake valve open timing, a spark timing, and a throttle position.

10. The method of claim 1 further comprising validating said engine simulation model at virtual engine operating points based on said actual engine data.

11. The method of claim 10 wherein said step of validating includes pre-processing of inputs to said engine simulation model and post-processing of outputs of said engine simulation model.

12. A method of mapping and modeling an engine during an engine development process, comprising:
    testing said engine over a plurality of actual engine operating conditions;
    gathering actual engine data corresponding to said actual engine operating conditions;
    determining a plurality of parameter functions based on said actual engine data, each of said plurality of parameter functions corresponding to an engine operating parameter;
    generating a plurality of combustion parameters for a plurality of engine operating conditions;

calibrating an engine simulation model based on said plurality of combustion parameters;

generating a plurality of engine maps using said engine simulation model;

generating a mean-value engine model (MVEM) based on said plurality of engine maps; and simulating engine dynamic responses during transient conditions using said MVEM.

13. The method of claim 12, wherein said plurality of combustion parameters are determined based on said plurality of actual engine operating conditions and a plurality of virtual engine operating conditions.

14. The method of claim 12 further comprising varying engine operating parameters over said engine operating conditions during said step of testing.

15. The method of claim 12 wherein said parameter functions are determined using a Wiebe function.

16. The method of claim 12 wherein said parameter functions include at least one of a spark timing, a burn duration, curve shaping factors, and a 50% burn location.

17. The method of claim 12 wherein each of said parameter functions is based on at least one of engine operating conditions and actuator inputs.

18. The method of claim 17 wherein each of said parameter functions is based on at least one of an engine speed, an intake manifold pressure, an exhaust manifold pressure, an air per cylinder, an exhaust valve closure timing, an intake valve open timing, a spark timing, and a throttle position.

19. The method of claim 12 further comprising validating said engine simulation model at virtual engine operating points based on said actual engine data.

20. The method of claim 19 wherein said step of validating includes pre-processing of inputs to said engine simulation model and post-processing of outputs of said engine simulation model.

* * * * *